United States Patent
Aragaki et al.

(10) Patent No.: US 8,098,308 B2
(45) Date of Patent: Jan. 17, 2012

(54) IMAGE PROCESSING DEVICE AND COMPUTER-READABLE STORAGE MEDIUM

(75) Inventors: Hideya Aragaki, Hino (JP); Takahiro Saito, Yokohama (JP); Yuki Ishii, Yokohama (JP)

(73) Assignees: Olympus Corporation, Tokyo (JP); Kanagawa University, Yokohama-shi (JP)

( * ) Notice: Subject to any disclaimer, the term of this patent is extended or adjusted under 35 U.S.C. 154(b) by 535 days.

(21) Appl. No.: 12/273,862

(22) Filed: Nov. 19, 2008

(65) Prior Publication Data

US 2009/0135278 A1 May 28, 2009

(30) Foreign Application Priority Data

Nov. 22, 2007 (JP) .................................. 2007-303551

(51) Int. Cl.
*H04N 5/335* (2011.01)

(52) U.S. Cl. ..................................... 348/280; 348/222.1

(58) Field of Classification Search .................. 348/272, 348/273, 275, 278–280
See application file for complete search history.

(56) References Cited

U.S. PATENT DOCUMENTS

| 6,392,699 B1 * | 5/2002 | Acharya ....................... 348/273 |
| 6,570,616 B1 * | 5/2003 | Chen ............................. 348/272 |
| 6,690,422 B1 * | 2/2004 | Daly et al. .................... 348/273 |

FOREIGN PATENT DOCUMENTS

| JP | 8-298669 A | 11/1996 |
| JP | 2000-151989 A | 5/2000 |

* cited by examiner

*Primary Examiner* — Tuan Ho
(74) *Attorney, Agent, or Firm* — Holtz, Holtz, Goodman & Chick, PC

(57) ABSTRACT

An image processing device that processes an image signal in which at least one of a predetermined plural number of color signals intended to constitute the image signal in each pixel is missing in accordance with a pixel position comprises: a component separation unit that separates the color signal into a plurality of components including a first component U, which is a skeleton component, and a second component V obtained from the residual difference between the color signal and the first component; a first interpolation unit that interpolates the first component U such that the first component U in a pixel position in which the color signal is missing is interpolated; and a second interpolation unit that interpolates the second component V such that the second component V in a pixel position in which the color signal is missing is interpolated.

18 Claims, 10 Drawing Sheets

FIG. 2A

| R00 | G01 | R02 | G03 | R04 |
|-----|-----|-----|-----|-----|
| G10 | B11 | G12 | B13 | G14 |
| R20 | G21 | R22 | G23 | R24 |
| G30 | B31 | G32 | B33 | G34 |
| R40 | G41 | R42 | G43 | R44 |

FIG. 2B

| Ru00 | Gu01 | Ru02 | Gu03 | Ru04 |
|------|------|------|------|------|
| Gu10 | Bu11 | Gu12 | Bu13 | Gu14 |
| Ru20 | Gu21 | Ru22 | Gu23 | Ru24 |
| Gu30 | Bu31 | Gu32 | Bu33 | Gu34 |
| Ru40 | Gu41 | Ru42 | Gu43 | Ru44 |

FIRST COMPONENT U

FIG. 2C

| Rv00 | Gv01 | Rv02 | Gv03 | Rv04 |
|------|------|------|------|------|
| Gv10 | Bv11 | Gv12 | Bv13 | Gv14 |
| Rv20 | Gv21 | Rv22 | Gv23 | Rv24 |
| Gv30 | Bv31 | Gv32 | Bv33 | Gv34 |
| Rv40 | Gv41 | Rv42 | Gv43 | Rv44 |

SECOND COMPONENT V

SIGNAL VALUE A PRIOR TO CORING PROCESSING

SIGNAL VALUE D FOLLOWING CORING PROCESSING

| Ru00 | Gu01 | Ru02 | Gu03 | Ru04 | Gu05 | Ru06 |
|------|------|------|------|------|------|------|
| Gu10 | Bu11 | Gu12 | Bu13 | Gu14 | Bu15 | Gu16 |
| Ru20 | Gu21 | Ru22 | Gu23 | Ru24 | Gu25 | Ru26 |
| Gu30 | Bu31 | Gu32 | Bu33 | Gu34 | Bu35 | Gu36 |
| Ru40 | Gu41 | Ru42 | Gu43 | Ru44 | Gu45 | Ru46 |
| Gu50 | Bu51 | Gu52 | Bu53 | Gu54 | Bu55 | Gu56 |
| Ru60 | Gu61 | Ru62 | Gu63 | Ru64 | Gu65 | Ru66 |

FIRST COMPONENT U

*FIG. 9*

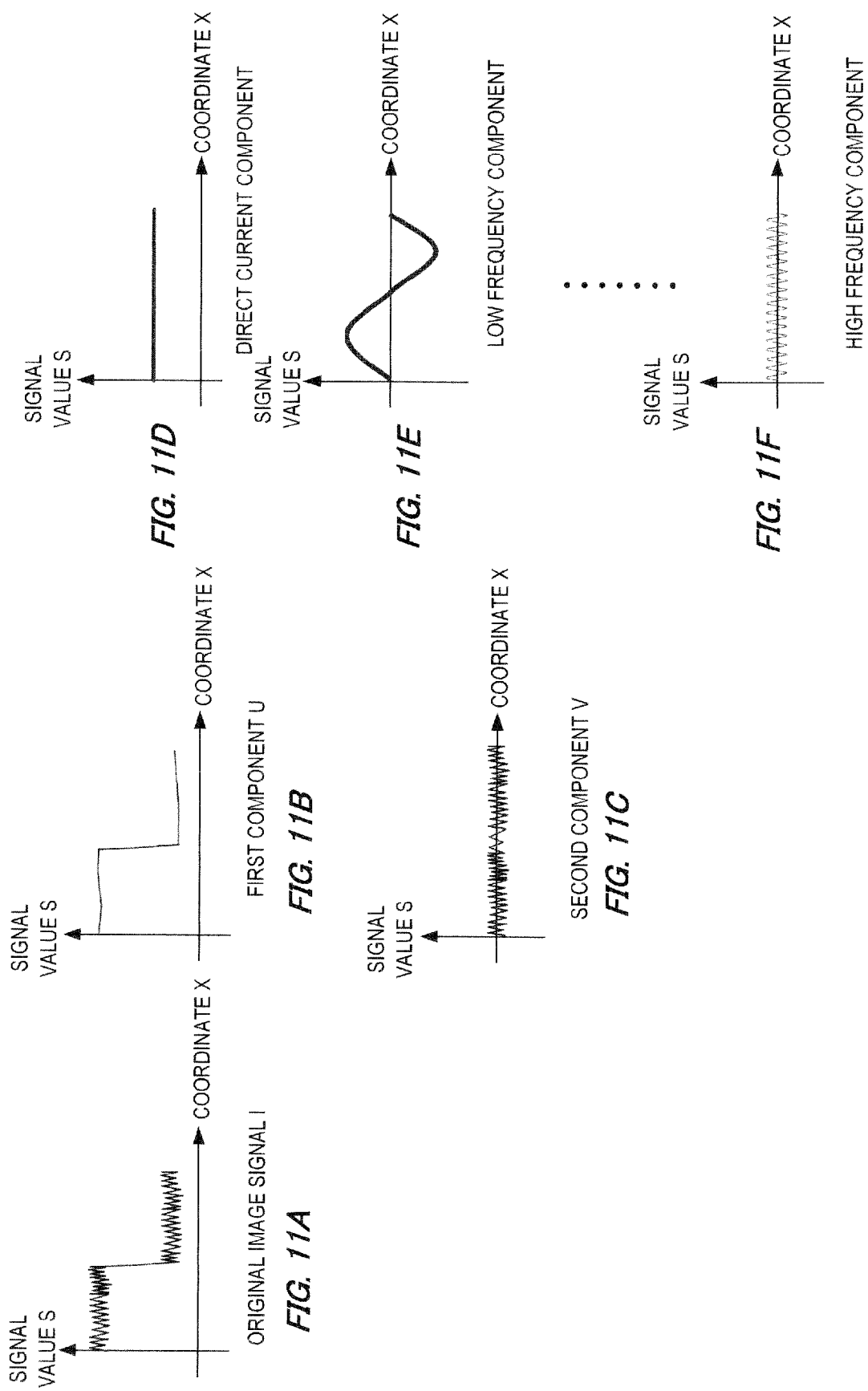

IMAGE PROCESSING DEVICE AND COMPUTER-READABLE STORAGE MEDIUM

TECHNICAL FIELD OF THE INVENTION

This invention relates to a technique for processing an image signal captured by a single plate image sensor in which an R, G, B three-primary color filter is disposed in mosaic form.

BACKGROUND OF THE INVENTION

In a single plate imaging system used in a digital camera or the like, a single plate image sensor in which filters of different colors are attached to each pixel is used, and therefore only one color component value can be obtained for each pixel in an output image from the sensor. As a result, interpolation processing for interpolating the missing color component values in each pixel is required to generate a color digital image. During the interpolation processing, the processing method must be modified to ensure that deterioration such as blurring and false color does not occur in the final color image. Various methods have been proposed in the prior art to achieve this.

The interpolation processing in JP8-298669A is for a single plate Bayer array image sensor having a color filter arrangement shown in FIG. 2A. As shown in FIG. 2A, a cross-shaped neighborhood of a subject pixel R22 is taken in relation to the image sensor, and interpolation values Gh, Gv relating to G in a horizontal direction and a vertical direction from the subject pixel are estimated as shown in Equation (1).

$$Gh=(G21+G23)/2+(2\times R22-R20-R24)/4$$

$$Gv=(G12+G32)/2+(2\times R22-R02-R42)/4 \quad (1)$$

Next, evaluation values dH, dV indicating which of the horizontal and vertical directions has the most steps are calculated as shown in Equation (2), whereupon the interpolation value of the direction determined to have a smaller evaluation value, i.e. the flatter direction, is used.

$$dH=|G21-G23|+|R20-2\times R22+R24|$$

$$dV=|G12-G32|+|R02-2\times R22+R42| \quad (2)$$

Here, |x| represents an absolute value of x.

Further, JP2000-151989A discloses an example in which different interpolation processing is applied to each color signal of an image signal output by a single plate image sensor, taking into consideration human visual sensitivity to each color signal. Of color signals R, G, B, the B signal has a relatively low contribution to visual sensitivity, and therefore nearest neighbor interpolation, which is simple but exhibits low interpolation precision, is applied to the B signal to achieve an increase in processing speed, whereas high image quality bicubic interpolation is applied to the R and G signals. Thus, an overall increase in processing speed can be achieved while maintaining image quality.

SUMMARY OF THE INVENTION

In JP8-298669A, interpolation values are determined from an original image signal, and therefore, in a region where a global edge structure and a texture component indicating a fine oscillation component or a noise component are superposed, the interpolation precision decreases. A similar problem occurs during calculation of the evaluation values, and as a result, it is difficult to calculate the evaluation values accurately.

Similarly in JP2000-151989A, a global edge structure and a texture component indicating a fine oscillation component or a noise component are mixed together in each color signal, and in regions where these components are superposed, the interpolation precision decreases, leading to false color and ringing in the edge portions.

According to an aspect of this invention, an image processing device is provided, the image processing device comprising: a component separation unit that separates at least one of a plurality of color signals corresponding respectively to a plurality of color components constituting an image having the plurality of color components into a plurality of components including a first component, which is a skeleton component, and a second component obtained on the basis of the at least one color signal and the first component; a first interpolation unit that interpolates the first component of the at least one color signal in a pixel position in which the color signal is missing; and a second interpolation unit that interpolates the second component of the at least one color signal in a pixel position in which the color signal is missing.

According to another aspect of this invention, an image processing device is provided, the image processing device comprising: a component separation unit that separates at least one of a plurality of color signals corresponding respectively to a plurality of color components constituting an image having the plurality of color components into a plurality of components including a first component constituted by a plurality of edges and a flat component located in a region between the plurality of edges, and a second component obtained on the basis of the at least one color signal and the first component; a first interpolation unit that interpolates the first component of the at least one color signal in a pixel position in which tire color signal is missing; and a second interpolation unit that interpolates the second component of the at least one color signal in a pixel position in which the color signal is missing.

According to a further aspect of this invention, a computer-readable storage medium storing a program that is executed by a computer is provided, the program comprising the steps of: separating at least one of a plurality of color signals corresponding respectively to a plurality of color components constituting an image having the plurality of color components into a plurality of components including a first component, which is a skeleton component, and a second component obtained on the basis of the at least one color signal and the first component; interpolating the first component of the at least one color signal in a pixel position in which the color signal is missing; and interpolating the second component of the at least one color signal in a pixel position in which the color signal is missing.

According to a further aspect of this invention, a computer-readable storage medium storing a program that is executed by a computer is provided, the program comprising the steps of: separating at least one of a plurality of color signals corresponding respectively to a plurality of color components constituting an image having the plurality of color components into a plurality of components including a first component constituted by a plurality of edges and a flat component located in a region between the plurality of edges, and a second component obtained on the basis of the at least one color signal and the first component; interpolating the first component of the at least one color signal in a pixel position in which the color signal is missing; and interpolating the second component of the at least one color signal in a pixel position in which the color signal is missing.

Embodiments and advantages of this invention will be described in detail below with reference to the attached figures.

BRIEF DESCRIPTION OF THE DRAWINGS

FIG. 2A is a view showing image data based on a Bayer array.

FIG. 2B shows a first component U generated when an image having the Bayer array shown in FIG. 2A is separated into components.

FIG. 2C shows a second component V generated when the image having the Bayer array shown in FIG. 2A is separated into components.

FIG. 9 is a view showing a 7×7 pixel block extracted from the first component U.

FIGS. 11A to 11C show examples of an original image signal I and the first component U and second component V obtained by separating the original image signal I into components.

FIGS. 11D to 11F show examples of a direct current component, a low frequency component, and a high frequency component generated when separation is performed on the basis of a frequency component such as a Fourier transform.

DESCRIPTION OF THE PREFERRED EMBODIMENTS

First Embodiment

Figure 1:
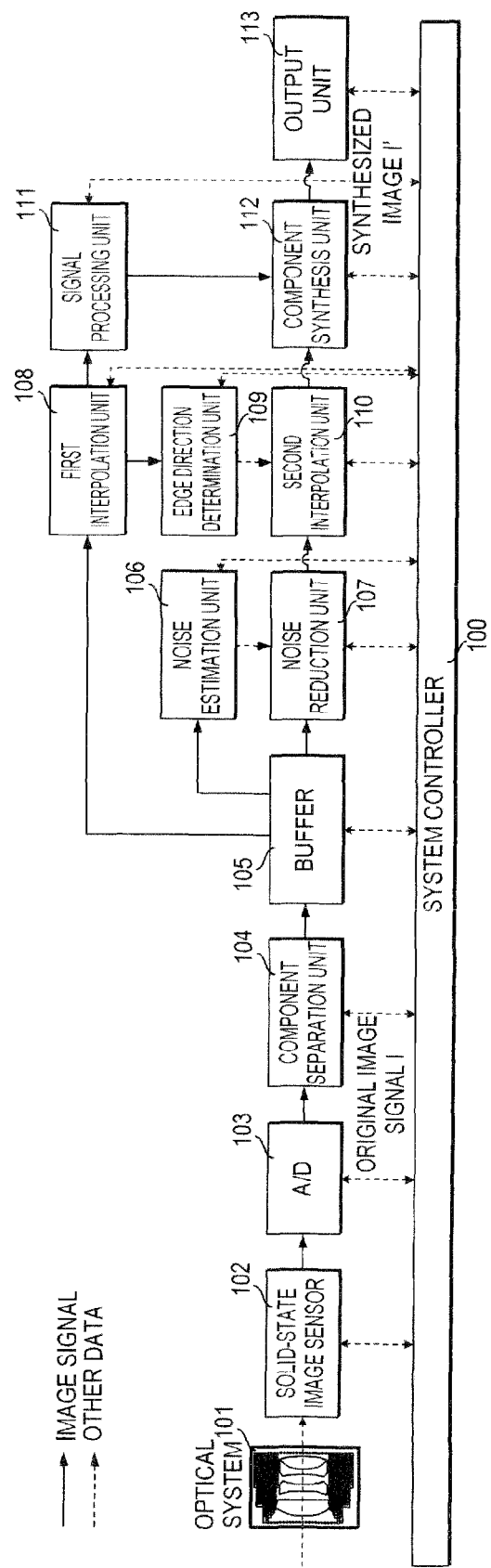
FIG. 1 is a block diagram showing an imaging device according to a first embodiment of this invention.

FIG. 1 is a system block diagram showing an imaging device according to a first embodiment of this invention. The imaging device is constituted by an optical system 101, a solid state image sensor 102, an A/D conversion unit 103 (A/D 103 hereafter), a component separation unit 104, a buffer 105, a noise estimation unit 106, a noise reduction unit 107, a first interpolation unit 108, an edge direction determination unit 109, a second interpolation unit 110, a signal processing unit 111, a component synthesis unit 112, an output unit 113, and a system controller 100.

The solid state image sensor 102 is connected to the component separation unit 104 via the A/D 103. The component separation unit 104 is connected to the buffer 105. The buffer 105 is connected to the first interpolation unit 108, noise estimation unit 106, and noise reduction unit 107. The noise estimation unit 106 is connected to the noise reduction unit 107. The first interpolation unit 108 is connected to the edge direction determination unit 109 and the signal processing unit 111. The noise reduction unit 107 and the edge direction determination unit 109 are connected to the second interpolation unit 110. The signal processing unit 111 and the second interpolation unit 110 are connected to the component synthesis unit 112. The component synthesis unit 112 is connected to the output unit 113. The respective processing units are connected bi-directionally to and controlled by the system controller 100.

A processing flow of FIG. 1 will now be described.

On the basis of the control of the system controller 100, the solid state image sensor 102 outputs an optical image formed on a surface of the solid state image sensor 102 via the optical system 101 as an analog image signal. The analog image signal is transferred to the A/D 103.

It should be noted that in this embodiment, a single plate image sensor in which a Bayer type primary color filter shown in FIG. 2A is disposed on a front surface thereof is envisaged as the solid state image sensor 102 (FIG. 2A shows a 5×5 pixel region as an example). Here, Rij, Gij, Bij represent red (R), green (G) and blue (B) pixels, respectively. Further, i and j (i, j=0, . . . , 4) represent X direction and Y direction coordinates, respectively.

A 2×2 pixel arrangement (R00, G01, G10, B11) serves as a basic unit of the Bayer type primary color filter. Green (G) color filters G01, G10 are disposed on two pixels in a diagonal direction, while a red (R) color filter R00 is disposed on one pixel in the other diagonal direction and a blue (B) color filter B11 is disposed, on the other pixel in the other diagonal direction.

The A/D 103 converts the analog signal into a digital signal. An original image signal I serving as the digital signal is transferred to the component separation unit 104.

In the component, separation unit 104, each color signal of the original image signal I is separated into a first component U and a second component V.

The first component U is a skeleton component (a geometrical image structure) of the original image signal I including a flat component (a component that varies gently) and an edge component The first component U is constituted by a sharp edge included in the original image signal I and a flat component exhibiting gentle luminance variation, which is compartmentalized by the edge and extracted from the original image signal I. The first component. U is defined as a global structural component representing an outline of the features of the original image signal I, or a component obtained by removing detailed structural components such as texture (texture components hereafter) from the original image signal I.

In contrast to the global structural component represented by the skeleton component, the second component V is defined as a local structural component representing the features of the original image signal I in relative detail, and includes a texture component representing a detailed structure, and a noise component. Alternatively, the second component V is defined as a remainder component obtained when of the first component U is subtracted from the original image signal I.

FIGS. 11B and 11C show examples of the first component U and the second component V, respectively, generated when the original image signal I shown in FIG. 11A is separated into components (here, a one-dimensional signal is shown for ease of description).

The sharp edge representing the global features included in the original image signal I is included in the first component U, whereas a fine oscillation component is included in the second component V. For comparison, FIGS. 11D to 11F show examples of a direct current component, a low frequency component, and a high frequency component generated when separation is performed on the basis of a frequency component such as a Fourier transform. The sharp edge representing the global features included in the original image signal I is expressed as a linear sum of each component, and is not therefore included in one specific component alone.

To facilitate description, in the case described here, the original image signal I is separated into two components, but the original image signal I may be separated into three or more components. Examples of methods for separating an image into components include addition type separation and multiplication type separation, which will be described in detail below.

The separated first component U is transferred to the first interpolation unit 108 and the noise estimation unit 106 via the buffer 105, and the second component V is transferred to the noise reduction unit 107 via the buffer 105.

In the first interpolation unit 108, a demosaicing method based on Total-Variation optimization is applied to the first component U. In so doing, highly precise interpolation processing can be performed on the global edge structure included in the first component, thereby increasing the edge sharpness and suppressing ringing distortion. The interpolation processing will be described in detail below. The interpolated first component U is then transferred to the edge direction determination unit 109 and the signal processing unit 111.

In the edge direction determination unit 109, an edge direction is determined on the basis of the first component U. An edge direction determination result is then transferred to the second interpolation unit 110. The direction determination processing will be described in detail below.

Figure 4:
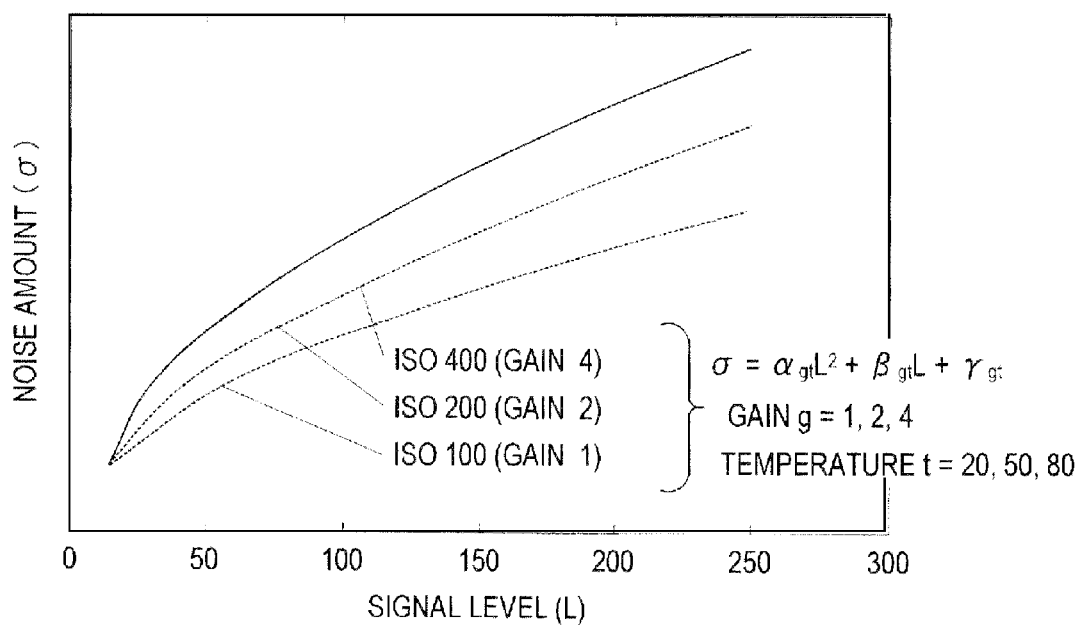
FIG. 4 is a view illustrating a noise model.

In the noise estimation unit 106, a noise amount σ included in the second component V corresponding to a signal level of the first component U is estimated in each pixel by referring to a signal level-noise distribution model (noise model hereafter) shown in FIG. 4 or approximation data thereof. The first component U is a skeleton component corresponding to the global edge structure of the original image signal I, and therefore a noise amount σ obtained from the signal level of the first component U is substantially equal to a noise amount σ included in the original image signal I, while the noise amount σ included in the original image signal I is separated as the noise component included in the second component V. In other words, by referring to the noise model on the basis of the signal level of the first component U, the noise amount included in the second component V can be estimated. Noise amount estimation will be described in detail below. The estimated noise amount σ is transferred to the noise reduction unit 107.

In the noise reduction unit 107, the second component V is obtained via the buffer 105 and the noise amount σ is obtained from the noise estimation unit 106. Noise reduction processing is then performed on the second component V by performing soft determination threshold processing (coring processing hereafter) based on the noise amount σ.

Here, the coring processing is typically processing in which, when an input signal belongs within a coring range set by a lower limit threshold and an upper limit threshold, the signal value thereof is set at zero uniformly, and when the input signal deviates from the coring range, the signal value thereof is set at a signal value obtained by subtracting or adding a threshold. In this embodiment, the lower limit threshold and upper limit threshold are controlled by the noise amount σ to realize noise reduction processing corresponding to the noise amount θ. The coring processing will be described in detail below. The noise-reduced second component V is transferred to the second interpolation unit 110.

In the second interpolation unit 110, the second component V reduced in noise is obtained from the noise reduction unit 107 and the edge direction is obtained from the edge direction determination unit 109. Directional interpolation processing based on the edge direction is then performed on the second component V. The interpolation processing will be described in detail below.

The interpolated second component V is then transferred to the component synthesis unit 112.

In the signal processing unit 111, predetermined signal processing such as WB correction, γ correction and color emphasis processing are implemented on the interpolated first component U, whereupon the processed first component U is transferred to the component synthesis unit 112.

In the component synthesis unit 112, the first component U subjected to interpolation processing and predetermined signal processing and the second component V subjected to interpolation processing are synthesized at a predetermined ratio, for example a ratio of 1:1, to obtain a synthesized image I'. The synthesized image I' is recorded on a storage medium constituted by a flash memory or the like by the output unit 113.

(Component Separation Unit)

Next, component separation, which is performed on the original image signal I in the component separation unit 104, will be described in detail.

When the first component U is extracted from the original image signal I, processing for holding the skeleton component of the original image signal I including a flat component (a component that varies gentry) and an edge component is used as a standard. As noted above, addition type separation and multiplication type separation may be used as image separation methods, and these methods will be described in sequence below.

Addition Type Separation

In addition type separation, the original image signal I is expressed as the sum of the first component U and the second component V, as shown in Equation (3).

$$I=U+V \quad (3)$$

First, a separation method employing a bounded variation function and a norm will be described.

An A2BC variation model (Aujol-Aubert-Blanc-Feraud-Chambolle model) described in Document A is used to perform separation.

Document A: Jean-Francois Aujol, Guy Gilboa, Tony Chan & Stanley Osher, Structure-Texture Image Decomposition-Modeling, Algorithms, and Parameter Selection, International Journal of Computer Vision, Volume 67, Issue 1 (April 2006) Pages: 111-136, Year of Publication: 2006

A property of the first component U determined as an optimal solution is modeled as a bounded variation function space BV constituted by a plurality of "smooth luminance variation small part regions" compartmentalized by discrete boundaries. The energy of the first component U is defined by a TV (Total-Variation) norm J(U) shown in Equation (4).

$$J(U)=\int\|\nabla U\|dx\,dy \quad (4)$$

Meanwhile, a function space of the second component V in Equation (3) is modeled as an oscillation function space G. The oscillation function space G is a function space expressed by oscillation generating functions g1, g2, as shown in Equation (5). The energy thereof is defined as G norm $\|V\|G$ in Equation (6).

$$V_{(x,y)} = \partial g_{1(x,y)} + \partial_x g_{2(x,y)}; g_1, g_2 \in L_\infty(R^2) \quad (5)$$

$$\|V\|_G = \inf_{g1,g2} \{\|(g_1)^2 + (g_2)^2\|_{L\infty}; V = \partial_x g_1 + \partial_x g_2\} \quad (6)$$

The separation problem of the original image signal I is formulated as a variation problem of Equation (7) for minimizing an energy functional. This variation problem can be solved by the projection method of Chambolle.

$$\inf_{U,V \in G_\mu} \left\{ J(U) + \frac{1}{2\alpha}\|I - U - V\|_{L2}^2 \right\} \quad (7)$$

$$\alpha > 0, \mu > 0, G_\mu = \{V \in G \mid \|V\|_G \le \mu\}$$

As a result, the second component V separated from the original image signal I receives a noise effect, whereas the first component U receives substantially no noise effect, and therefore the skeleton component (geometrical image structure) is extracted without blunting the edges.

Other examples of addition type separation methods include adaptive smoothing using a median filter, a morphology filter, and so on. Examples of addition type separation methods that do not depend on a bounded variation function are listed below.

EXAMPLE 1

In this method, a result obtained by performing median filter processing on the original image signal I is set as the first component U, and the remainder of the original image signal I following extraction of the first component U is set as the second component V.

EXAMPLE 2

In this method, a result obtained by applying a multivalue morphology filter to the original image signal I is set as the first component U, and the remainder of the original image signal I following extraction of the first component U is set as the second component V.

EXAMPLE 3

In this method, a result obtained by applying a bilateral filter to the original image signal I is set as the first component U, and the remainder of the original image signal I following extraction of the first component U is set as the second component V.

Multiplication Type Separation

Next, a multiplication type separation method will be described. In multiplication type separation, the original image signal I is represented by the product of the first component U and the second component V. When a logarithmic original image signal obtained by logarithmic converting the original image signal I is set as f, the original image signal I can be converted into an addition type separation problem, as shown in Equation (8).

$$I = U * V$$

$$f = u + v;$$

$$f = \log I, u = \log U, v = \log V \quad (8)$$

Here, a separation method employing a bounded variation function and a norm, similarly to the above method, will be described. A multiplication type separation problem can be solved using the A2BC variation model in a logarithmic region, similarly to addition type separation. An A2BC variation model in a logarithmic region will now be described briefly in relation to multiplication type separation.

The function space of the logarithmic first component U in Equation (8) is modeled as a bounded variation function space BV constituted by a plurality of "smooth luminance variation small part regions" compartmentalized by discrete boundaries, similarly to the first component U in the addition type separation model described above. The energy of the logarithmic first component U is defined by a TV (Total-Variation) norm J(U) shown in Equation (9).

$$J(u) = \int \|\nabla u\| dx dy \quad (9)$$

Meanwhile, a function space of the logarithmic second component V in Equation (8) is modeled as an oscillation function space G. The oscillation function space G is a function space expressed by oscillation generating functions g1, g2, as shown in Equation (10). The energy thereof is defined as G norm $\|V\|G$ in Equation (11).

$$v_{(x,y)} = \partial_x g_{1(x,y)} + \partial_x g_{2(x,y)}; g_1, g_2 \in L_\infty(R^2) \quad (10)$$

$$\|v\|_G = \inf_{g1,g2} \{\|(g_1)^2 + (g_2)^2\|_{L\infty}; v = \partial_x g_1 + \partial_x g_2\} \quad (11)$$

Hence, the separation problem of the logarithmic original image signal f is formulated as a variation problem of Equation (12) for minimizing an energy-functional.

$$\inf_{u,v \in G_\mu} \left\{ J(u) + \frac{1}{2\alpha}\|f - u - v\|_{L2}^2 \right\} \quad (12)$$

$$\alpha > 0, \mu > 0, G_\mu = \{v \in G \mid \|v\|_G \le \mu\}$$

As a result, the second component V separated from the original image signal I receives a noise effect, whereas the first component U receives substantially no noise effect, and therefore the skeleton component (geometrical image structure) is extracted without blunting the edges.

Other examples of multiplication type separation methods include adaptive smoothing using a median filter, a morphology filter, and so on. Examples of multiplication type separation methods that do not depend on a bounded variation function, are listed below.

EXAMPLE 1

In this method, a result obtained by performing median filter processing on the original image signal I is set as the first component U, and a component obtained by dividing the first component U by the original image signal I is set as the second component V.

EXAMPLE 2

In this method, a result obtained by applying a multivalue morphology filter to the original image signal I is set as the first component U, and a component obtained by dividing the first component U by the original image signal I is set as the second component V.

EXAMPLE 3

In this method, a result obtained by applying a bilateral filter to the original image signal I is set as the first component U, and a component, obtained by dividing the first component U by the original image signal I is set as the second component V.

Here, both addition type separation and multiplication type separation are performed independently on each color signal. With respect to the R signal and B signal, a horizontal direction is set as an X axis and a vertical direction is set as a Y axis. With respect to the G signal, a 45-degree diagonal direction is set as the X axis and a −45-degree diagonal direction is set as the Y axis.

FIGS. 2B and 2C show the first component U and second component V generated when an image having the Bayer array shown in FIG. 2A is separated into components.

Here, Ruij, Guij, Buij (i, j=0, ... , 4) represent the first component of R, G, B, respectively. Rvij, Gvij, Bvij (i, j=0, ... , 4) represent the second component of R, G, B, respectively.

A relationship between the respective pixel values in mutually corresponding positions of the original image signal I, the first component U, and the second component V is Rij=Ruij+Rvij in the case of addition type separation, and Rij=Ruij×Rvij in the case of multiplication type separation.

The separated first component: U and second component V are transferred to the buffer 105.

(First Interpolation Unit)

Next, the interpolation processing performed on the first component U in the first interpolation unit 108 will be described.

The first component U is separated as a bounded variation function including a discrete jump corresponding to an edge, a line, or the like, and therefore, when a linear interpolation method is applied, excessive edge blurring and ringing distortion may occur on the edges. To suppress these artifacts, a super-resolution demosaicing (SD-TV hereafter) method employing TV (Total-Variation) normalization described in Document B is applied.

Document B: Komatsu, Saito, "Proposal for demosaicing method employing super-resolution method" 2004IMPS, I-4.07, 2004

In the SD-TV method, Total-Variation normalization is taken into account, and therefore the bounded variation function is interpolated by appropriately adding a specific component that is effective in suppressing ringing distortion to frequency components that are equal to or greater than the Nyquist frequency. As a result, a demosaiced image with little blurring and no obvious ringing distortion is obtained.

The SD-TV method is formulated as a variation problem for minimizing the energy functional shown in Equation (13), and the first component U following minimization thereof is set as the demosaicing result.

$$\int_{T_N} |\nabla w| dx dy + \lambda \cdot \sum_{m,n=0}^{N-1} |(s \cdot w)(m, n) - u_{m,n}|^2, \lambda > 0 \quad (13)$$

Here, w denotes a restored image output as the demosaicing result, u denotes an observed image input as an initial image prior to demosaicing, and s denotes a linear operator obtained by band-limiting a blur/hold integral operator relating to the restored image w to a Nyquist frequency band.

The first item integration represents the Total-Variation norm of the restored image w, and denotes an energy amount evaluating the occurrence of ringing.

The second item is an energy item evaluating the fidelity of the restored image w relative to the observed image u, taking into account image blurring and sub-sampling.

By setting a value obtained by partially differentiating the energy functional of Equation (13) with respect to each pixel value of the restored image w at zero, a Euler-Lagrange equation is obtained. In actuality, the Euler-Lagrange equation is rewritten in a time evolution equation format such that the restored image w is determined by a repeated calculation.

$$w_{i,j}^{(n+1)} = \quad (14)$$

$$w_{i,j}^{(n)} + \lambda \cdot \left\{ \varepsilon \cdot \left[ \left( \frac{\Delta^x w_{i,j}^{(n)}}{|\nabla w|_{(i,j)}^{(n)}} - \frac{\Delta^x w_{i-1,j}^{(n)}}{|\nabla w|_{(i-1,j)}^{(n)}} \right) + \left( \frac{\Delta^x w_{i,j}^{(n)}}{|\nabla w|_{(i,j)}^{(n)}} - \frac{\Delta^x w_{i,j-1}^{(n)}}{|\nabla w|_{(i,j-1)}^{(n)}} \right) \right] - \frac{2}{N^2 \cdot K^2} \cdot IDFT_{(KN \times KN)} \left[ \bar{\bar{s}}_{\xi+k \cdot N, \eta+l \cdot N} \cdot \hat{e}_{\xi,\eta} \right]_{(i,j)} \right\}$$

$$\hat{e}_{\xi,\eta} = \frac{1}{K^2} \sum_{k',l'=0}^{K-1} \bar{\bar{s}}_{\xi+k' \cdot N, \eta+l' \cdot N} \cdot \hat{w}_{\xi+k' \cdot N, \eta+l' \cdot N}^{(n)} - \hat{u}_{\xi,\eta}$$

The first component U interpolated using the method described above is then transferred to the edge direction determination unit 109 and the signal processing unit 111.

(Noise Estimation Unit)

Next, a method of estimating the noise amount in the noise estimation unit 106 will be described.

In the noise estimation unit 106; a noise model measured on the basis of actual measurement relating to the second component V is recorded, and by referring to the noise model, the noise amount σ relative to the signal value of the second component V is estimated in each pixel.

The noise model will now be described.

The noise amount σ increases in the manner of a quadratic curve relative to a signal level $L_0$ immediately following conversion by the A/D 103. As disclosed in JP2005-175718A, when a signal level noise distribution model (noise model) is represented by a quadratic function, Equation (15) is obtained.

$$\sigma = \alpha L_0^2 + \beta L_0 + \gamma \quad (15)$$

Here, α, β and γ are constant items.

However, the noise amount σ varies in accordance with the sensor temperature and gain in addition to the signal level. FIG. 4 shows an example in which noise amounts σ are plotted with respect to three ISO sensitivity (gain) values 100, 200, 400 relating to the gain at a certain temperature t. Curves that differ according to the ISO sensitivity relating to the gain are depicted. When the gain is set as g, the temperature is set as t, and noise model formulation is performed in a manner taking the above into account, the noise amount σ may be represented by Equation (16).

$$\sigma = \alpha_{gt} L_0^2 + \beta_{gt} L_0 + \gamma_{gt} \quad (16)$$

Here, $\alpha_{gt}$, $\beta_{gt}$ and $\gamma_{gt}$ are constant items determined in accordance with the gain g and the temperature t. In the case of a color image signal, this noise model may be applied independently to each color signal.

The noise model described above is recorded in the noise estimation unit 106 in advance and used to estimate the noise amount σ on the basis of the signal level. The signal level of the first component U serving as a skeleton component is used as the signal level, and in so doing, the precision of the estimation can be improved. The noise amount σ obtained here is substantially equal to the noise amount σ included in the original image signal I, or more specifically the noise amount σ included in the second component V separated from the original image signal I. The noise amount σ is transferred to the noise reduction unit 107.

It should be noted that here, the noise amount is estimated in each pixel, but the noise amount may be estimated in a local region including the subject pixel.

(Noise Reduction Unit)

Next, an operation of the noise reduction unit 107 will, be described in detail.

In the noise reduction unit 107, noise reduction processing by means of coring processing is performed on the second component V in each pixel on the basis of the noise amount estimated by the noise estimation unit 106.

First, using Equation (17), a coring upper limit width $T_1$ and a coring lower limit width $T_2$ are set at values that are proportional to the noise amount σ from the noise amount σ estimated by the noise estimation unit 106.

$$T1 = k\sigma$$

$$T2 = -k\sigma \quad (17)$$

Here, k is a predetermined coefficient, and is set at 0.5, for example.

Figure 5:
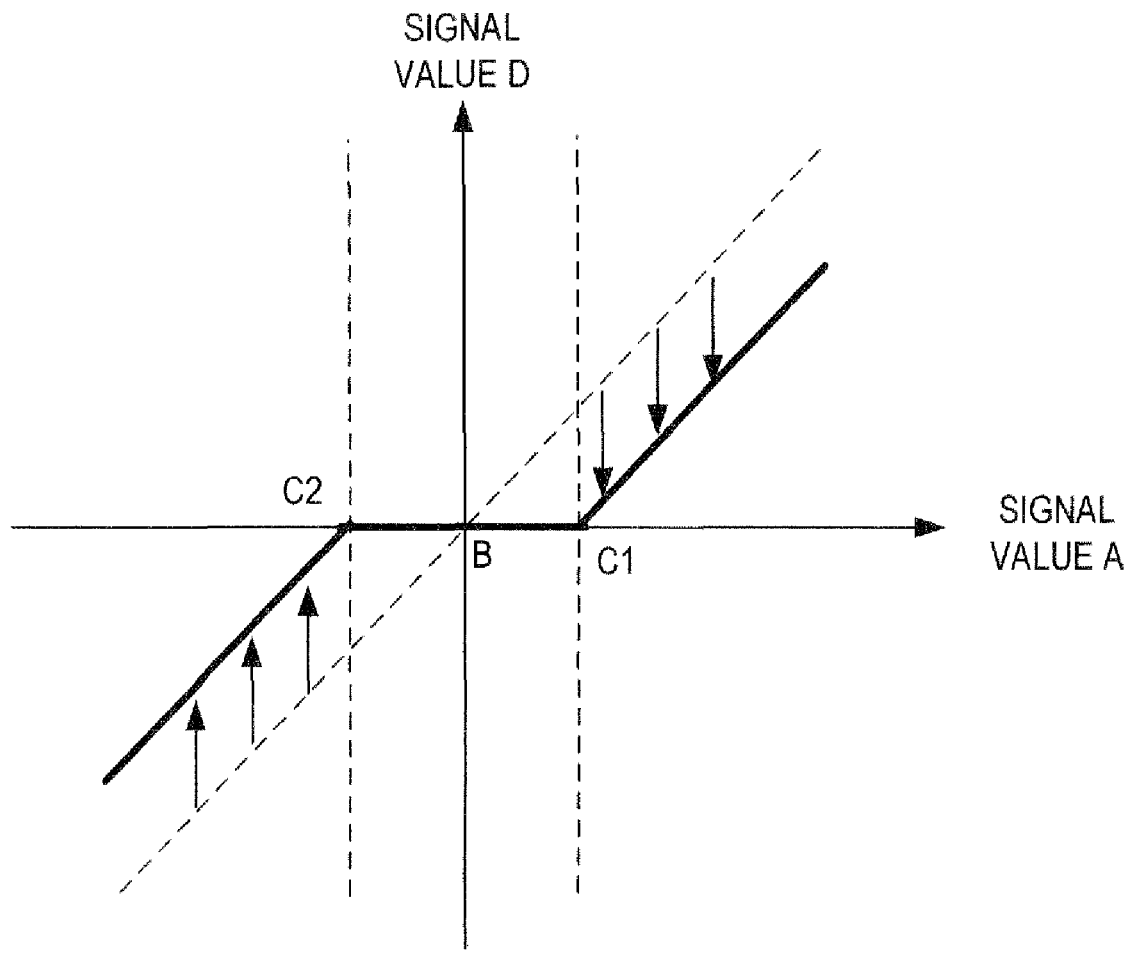
FIG. 5 is a view illustrating coring processing.

Next, the second component V is obtained from the buffer 105, whereupon noise reduction is performed by performing coring processing, or in other words signal processing according to which a relationship between a pre-processing signal value A and a post-processing signal value D is as expressed by Equation (18) and the graph shown in FIG. 5.

$$\text{When } B+T1 < A \; D = A - T1 - B$$

$$\text{When } B+T2 < A < A+T1 \; D = B$$

$$\text{When } A < B+T2 \; D = A - T2 - B \quad (18)$$

Here, B is a reference value. An upper limit, threshold C1 corresponds to B+T1 (T1>0) and a lower limit threshold C2 corresponds to B+T2 (T2<0).

Figure 6A:
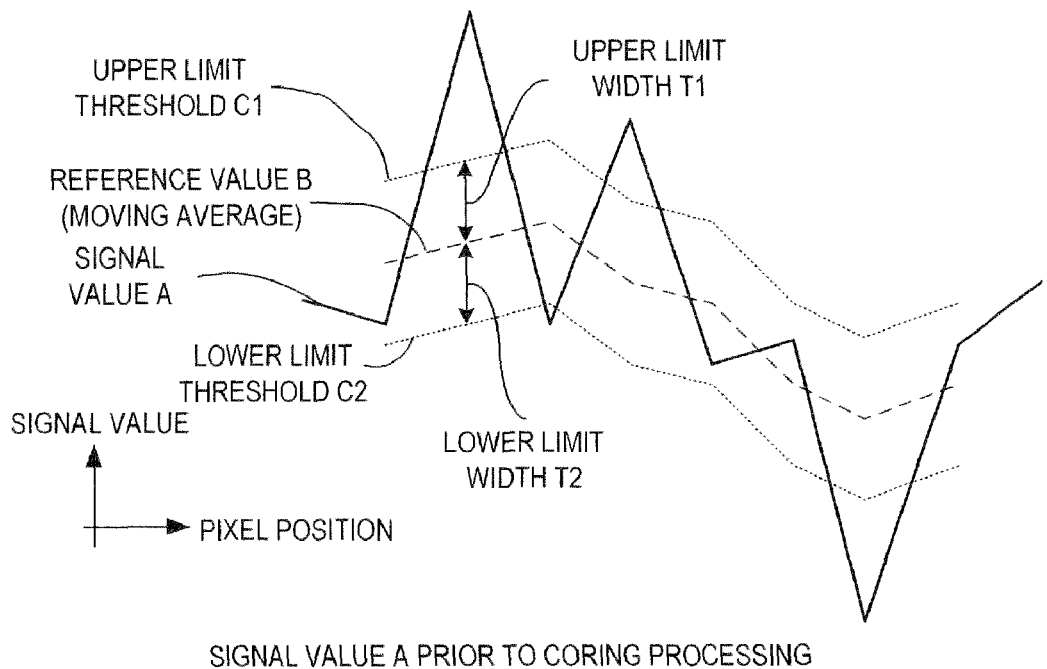
FIG. 6A is a view showing a pre-coring processing signal value A.
Figure 6B:
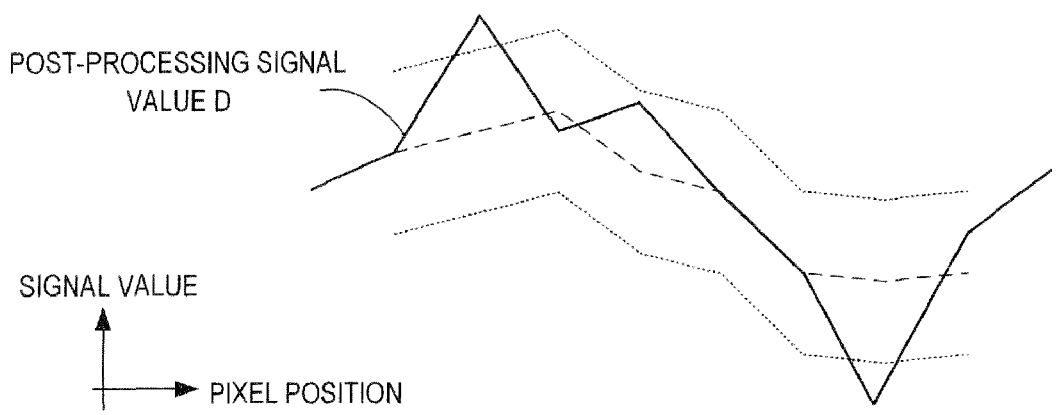
FIG. 6B is a view showing a post-coring processing signal value D.

FIGS. 6A and 6B show the manner in which the coring processing is performed. When coring processing is performed on a one dimensional signal value A shown in FIG. 6A, a signal value D shown in FIG. 6B is obtained.

Here, a moving average of the signal value A is typically used as the reference value B, but since the processing subject second component V is obtained by removing the first, component U. i.e. the skeleton component, from the original image signal I, the reference value B is set at zero in this embodiment.

The coring processing result is transferred to the second interpolation unit 110.

(Edge Direction Determination Unit)

Next, an operation of the edge direction determination unit 109 will be described in detail.

In the edge direction determination unit 109, first, the first component U interpolated by the first interpolation unit 108 is obtained, whereupon a rectangular region of a predetermined size centering on the subject pixel, for example an encompassed 5×5 pixel block in this embodiment, is extracted from the first component U of each color signal. It should be noted that the size of this region may be set differently if necessary. Next, an evaluation value for determining the edge direction is calculated for each direction on the basis of the extracted pixel block.

Figure 3:
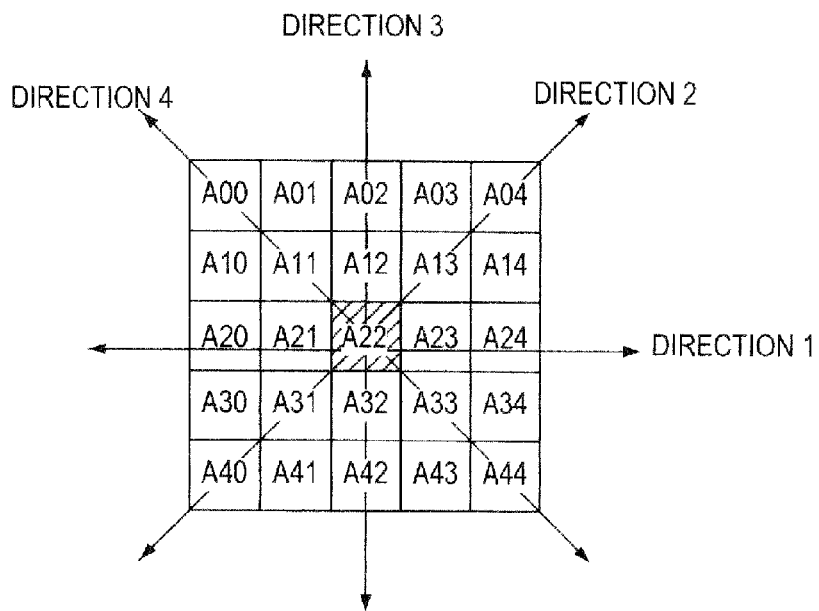
FIG. 3 is a view illustrating a direction determination method.

FIG. 3 is a view showing the manner in which a direction is determined from the extracted 5×5 pixel block.

A00 to A44 respectively denote the pixels included in a pixel block extracted in relation to a predetermined color signal, and a central pixel A22 corresponds to the subject pixel position. In this embodiment, the edge directions to be determined correspond to directions 1 to 4 (four directions) shown in FIG. 3. The number of directions may be increased to eight or the like if necessary. During direction determination, evaluation values are calculated for each of the direction 1 to the direction 4 to determine the direction that follows the edge to the greatest extent. Various values may be used as the evaluation values, but in this embodiment, evaluation values E1 to E4 calculated on the basis of the evaluation equations shown in Equation (19) are used. E1 to E4 are evaluation values corresponding respectively to directions 1 to 4.

$$E1 = |A22-A23|+|A22-A24|+|A22-A21|+|A22-A20|$$

$$E2 = |A22-A13|+|A22-A04|+|A22-A31|+|A22-A40|$$

$$E3 = |A22-A12|+|A22-A02|+|A22-A32|+|A22-A42|$$

$$E4 = |A22-A11|+|A22-A00|+|A22-A33|+|A22-A44| \quad (19)$$

When an edge exists, the evaluation value increases, and when an edge does not exist, the evaluation value decreases.

By detecting the smallest value from E1 to E4 and determining that an edge does not exist in the corresponding direction, the edge direction determination unit 109 determines that the corresponding direction follows the edge.

The detected edge direction is transferred to the second interpolation unit 110.

(Second Interpolation Unit)

Next, an operation of the second interpolation unit 110 will be described in detail.

In the second interpolation unit 110, the noise-reduced second component. V is obtained from the noise reduction unit 107, whereupon a rectangular region of a predetermined size centering on the subject pixel, for example a encompassed 5×5 pixel block in this embodiment, is extracted from the second component V.

FIG. 2C is a view showing the 5×5 pixel block extracted from the second component V. Rvij, Gvij, Bvij respectively denote pixels of the second component V in red (R), green (G), and blue (B), wherein i and j (i, j=0, ... , 4) represent X direction and Y direction coordinates, respectively. First, an edge direction corresponding to the color signal of tire subject pixel is obtained by the edge direction determination unit 109. In accordance with the obtained edge direction, interpolation of the G signal, or in other words generation of a G signal in the position of R or B, is performed.

An example of a process for generating a missing G signal Gv22 in the position 22 of FIG. 2C will be described below.

When the obtained edge direction is E1, it is determined that an edge is formed in a horizontal direction, and therefore Gv22 is generated using horizontal direction interpolation, processing shown in Equation (20).

$$Gv22 = (Gv21+Gv23)/2 \quad (20)$$

When the obtained edge direction is E2, it is determined that an edge is formed in a vertical direction, and therefore Gv22 is generated using vertical direction interpolation processing shown in Equation (21).

$$Gv22 = (Gv12+Gv32)/2 \quad (21)$$

When the obtained edge direction is E2 or E4, it is determined that an edge is formed in a 45° or a −45° diagonal direction, and therefore Gv22 is generated using isotropic, interpolation processing shown in Equation (22).

$$Gv22=(Gv12+Gv32+Gv21+Gv23)/4 \qquad (22)$$

The processing described above is performed in relation to all missing Gv pixels.

When a G signal having a pixel value has been generated in relation to all pixels using the processing described above, missing pixels in the R and B signals are generated using the generated G signals through interpolation processing. R, B interpolation is performed through linear interpolation of color difference.

An example of a process for generating missing R signals Rv12, Rv23, Rv13 in positions 12, 23, 13 of FIG. 2C will be described below.

Rv12 is generated by vertical direction interpolation processing shown in Equation (23).

$$Rv12=\{((Rv02-Gv02)+(Rv22-Gv22))/2\}+Gv12 \qquad (23)$$

Rv23 is generated by horizontal direction interpolation processing shown in Equation (24).

$$Rv23=\{((Rv22-Gv22)+(Rv24-Gv24))/2\}+Gv23 \qquad (24)$$

Rv13 is generated by isotropic interpolation processing shown in Equation (25).

$$Rv13=\{((Rv02-Gv02)+(Rv04-Gv04)+(Rv22-Gv22)+(Rv24-Gv24))/4\}+Gv13 \qquad (25)$$

By subjecting a color difference signal (Rvij−Gvij) to linear interpolation in this manner, all missing Rv pixels are generated.

A method of interpolating an R signal was described above, but a missing B signal may be calculated using similar processing by replacing R with B. The interpolated second component V is transferred to the component synthesis unit 112.

Next, the actions and effects of the above image processing will be described.

According to the image processing described above, the first component U and the second component V are separated, whereupon optimum interpolation processing taking into account the characteristics of each component is applied to each component. As a result, high quality interpolation processing can be performed.

Further, interpolation processing corresponding to the features of the interpolated first component U (in the first embodiment, an edge direction determined from the previously interpolated first component U) is performed on the second component V, and therefore interpolation processing can be performed while taking into consideration the features of the previously interpolated first component U. As a result, high quality interpolation processing can be performed.

Further, during Interpolation of the first component U, edge portion ringing is evaluated briefly through Total-Variation and then optimized. Hence, highly precise interpolation processing can be performed while maintaining the edge structure.

Moreover, the interpolated first component U and second component V are synthesized, whereby an image signal I' subjected to optimum interpolation processing corresponding to the features of each component is obtained in relation to the original image signal I.

Moreover, noise reduction is performed on the separated second component V, and therefore highly precise noise reduction processing that does not affect the global edge structure included in the first component U can be performed. At this time, a noise amount in each local region of the second component V is estimated in advance, whereupon noise reduction processing is performed on the basis of the noise amount. As a result, highly precise noise reduction processing corresponding to the degree of noise attached to a local region of the second component V can be performed.

It should be noted that in the processing of this embodiment, an image signal captured through a Bayer type primary color filter is used as a subject. However, this invention is not limited thereto, and the processing of this embodiment may be applied to an image signal captured using a predetermined color filter arrangement.

Further, in the first interpolation unit 108, an SD-TV method is applied, and in the second interpolation unit 110, linear interpolation processing taking the edge direction into account is applied. However, this invention is not limited thereto, and various pre-existing interpolation processing methods, such as a bicubic interpolation method and a nearest neighbor interpolation method, may be applied in combination, taking into consideration the features of each component, the processing time, and so on.

Furthermore, in the second interpolation unit 110, the edge direction is calculated as a parameter representing the features of the first component U, and interpolation processing is performed using the calculated edge direction. However, the parameter (the feature quantity used as the parameter) is not limited thereto, and various parameters extracted from the first component U, such as an edge intensity, a contrast, a histogram, and a cross-correlation coefficient between color signals, for example, may be calculated such that interpolation processing is performed on the second component V using these parameters. On the other hand, the processing of the second interpolation unit 110 may be performed independently, irrespective of the features of the first component U.

Moreover, in the first embodiment, the processing performed from the component separation unit 104 to the component synthesis unit 112 is realized as hardware processing as a prerequisite, but this processing may be realized as software processing.

Figure 7:
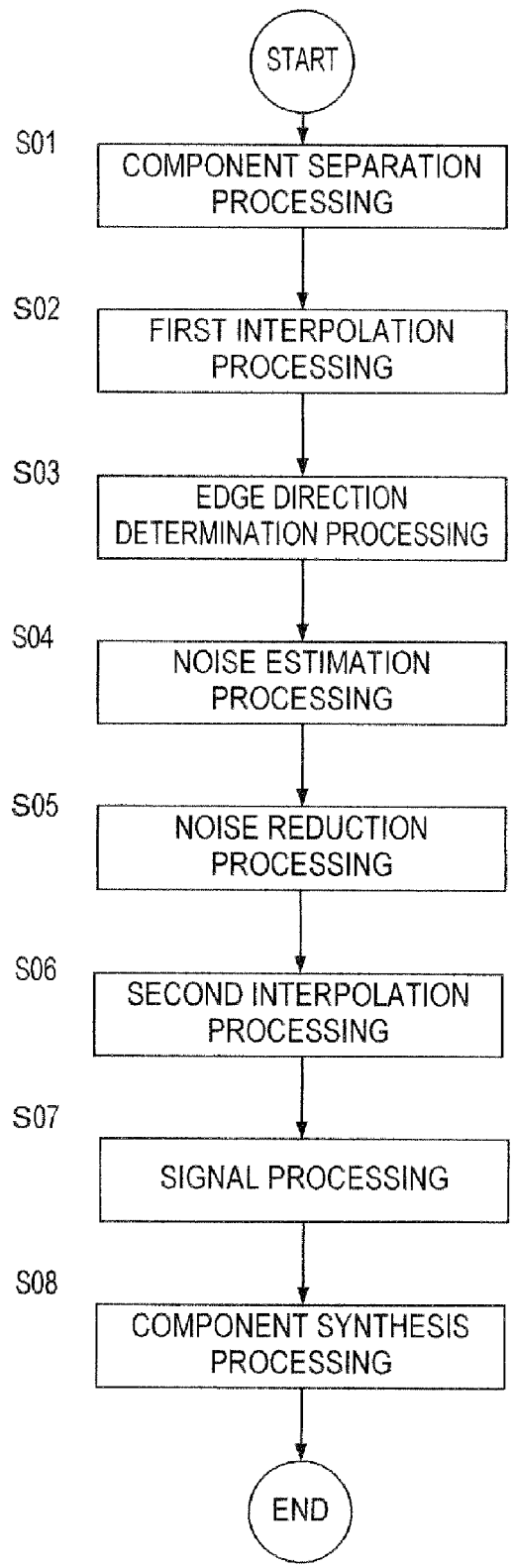
FIG. 7 is a flowchart, corresponding to processing from a component separation unit 104 to an image synthesis unit 112, according to the first embodiment.

FIG. 7 is a flowchart showing a case in which the processing performed from the component separation unit 104 to the component synthesis unit 112 is realized as software processing. The software is stored on a computer-readable storage medium such as a magnetic disk, a magneto-optical disk, a CD-ROM, a DVD-ROM, or a semiconductor memory, or distributed via a communication line. The software is read to a RAM of a computer and executed by a CPU of the computer, whereby the processing described above is executed.

In a step S01 the original image signal I is separated into the first component U and the second component V.

In a step S02, interpolation processing based on Total-Variation is performed on the first component U.

In a step S03, the evaluation values indicating the edge directions are calculated on the basis of the first component U, whereupon the edge direction is determined on the basis of the evaluation values.

In a step S04, the noise amount σ is estimated in relation to the second component V on the basis of the signal level of the first component U.

In a step S05, noise reduction processing is performed on the second component V through coring processing based on the noise amount σ estimated in S04.

In a step S06, interpolation processing is performed on the noise-reduced second component V on the basis of the edge direction determined in S03.

In a step S07, predetermined signal processing, such as WB adjustment, γ correction and color emphasis processing, is implemented on the interpolated first component U.

In a step S08, the interpolated first component U and the interpolated second component V are synthesized, whereby the synthesized image I' is obtained.

As has been described, the processing performed from the component separation unit 104 to the component synthesis unit 112 may be realized as software processing, and the same actions and effects can be achieved as in the case where the processing is realized as hardware processing.

Second Embodiment

Figure 8:
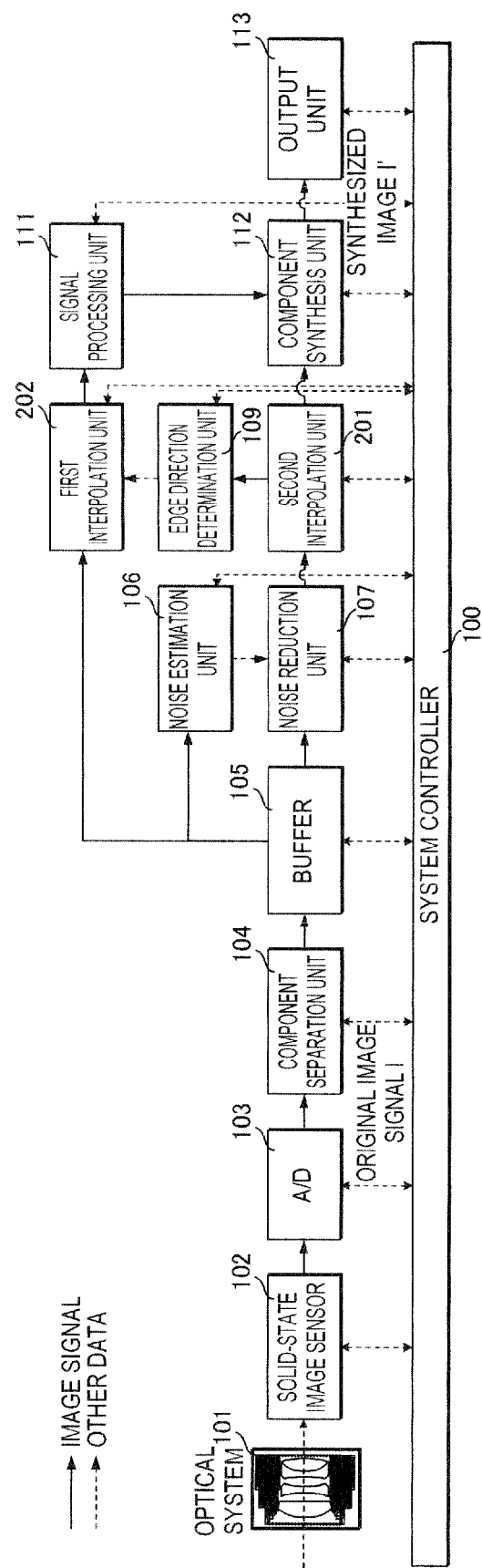
FIG. 8 is a block diagram showing an imaging device according to a second embodiment of this invention.

FIG. 8 is a system diagram of an imaging device according to a second embodiment of this invention.

The basic constitution of this embodiment is identical to that of the first embodiment, and therefore identical constitutions have been allocated identical names and numbers. Only different parts will be described below.

This embodiment differs from the first embodiment shown in FIG. 1 in that the first interpolation unit 108 is replaced by a first interpolation unit 202 and the second interpolation unit 110 is replaced by a second interpolation unit 201.

The noise reduction unit 107 is connected to the second interpolation unit 201, and the second interpolation unit 201 is connected to the edge direction determination unit 109 and the component synthesis unit 112. The buffer 105 and the edge direction determination unit 109 are connected to the first interpolation unit 202. The first interpolation unit 202 is connected to the signal processing unit 111.

In the first embodiment, interpolation processing is performed on the second component V in the second interpolation unit 110 on the basis of the edge direction of the first component U interpolated by the first interpolation unit 108. In the second embodiment, on the other hand, interpolation processing is first performed on the noise-reduced second component V in the second interpolation unit 201, whereupon interpolation processing is performed on the first component in the first interpolation unit 202 on the basis of an edge direction determined from the interpolated second component V.

The processing flow shown in FIG. 8 will now be described.

Similarly to the first embodiment, the first component U separated by the component separation unit 104 is transferred to the first interpolation unit 202 and the noise estimation unit 106 via the buffer 105, while the second component V is transferred to the noise reduction unit 107 via the buffer 105. In the noise reduction unit 107, noise reduction processing is performed on the second component V on the basis of the noise amount σ estimated in the noise estimation unit 106. The noise-reduced second component V is then transferred to the second interpolation unit 201. Predetermined interpolation processing is performed in the second interpolation unit 201. This interpolation processing will be described in detail below. The interpolated second component V is then transferred to the edge direction determination unit 109 and the component synthesis unit 112. In the edge direction determination unit 109, an edge direction is determined from the second component V using similar processing to that of the first embodiment, whereupon the determined edge direction is transferred to the first interpolation unit 202. In contrast to the first embodiment, however, the second component V is input instead of the first component U such that the edge direction is determined on the basis of the second component V.

In the first interpolation unit 202, interpolation processing based on the edge direction transferred from the edge direction determination unit 109 is performed on the first component U, whereupon the interpolated first component U is transferred to the signal processing unit 111. This interpolation processing will be described in detail below.

In the signal processing unit 111, the interpolated first component U is subjected to predetermined signal processing and then synthesized with the interpolated second component V by the component synthesis unit 112, whereupon the synthesized image signal is recorded on a storage medium such as a flash memory by the output unit 113.

(Second Interpolation Unit)

Next, an operation of the second interpolation unit 201 will be described in detail.

In the second interpolation unit 201, the noise-reduced second component V is obtained from the noise reduction unit 107, whereupon a rectangular region of a predetermined size centering on the subject pixel, for example an encompassed 5×5 pixel block in this embodiment, is extracted from the second component V.

FIG. 2C is a view showing the 5×5 pixel block extracted from the second component V.

First, G signal interpolation, or in other words generation of a G signal in the position of R or B, is performed. To describe an example of a process for generating a missing G signal Gv22 in the position 22 of FIG. 2C, Gv22 is generated using the linear interpolation processing shown in Equation (22). Similar processing is performed on all of the missing Gv pixels.

When a G signal having a pixel value has been generated in relation to all pixels using the processing described above, missing pixels in the R and B signals are generated using the generated G signals through interpolation processing. R, B interpolation is performed through linear interpolation of color difference.

To describe an example of a process for generating missing R signals Rv12, Rv23, Rv13 in positions 12, 23, 13 of FIG. 2C, Rv12 is generated by the horizontal direction interpolation processing shown in Equation (23). Rv23 is generated by the vertical direction interpolation processing shown in Equation (24), and Rv13 is generated by the isotropic interpolation processing shown in Equation (25). By subjecting the color difference signal (Rvij−Gvij) to linear interpolation in this manner, ail missing Rv pixels are generated.

A method of interpolating an R signal was described above, but a missing B signal may be calculated using similar processing by replacing R with B. The interpolated second component V is transferred to the edge direction determination unit 109 and the component synthesis unit 112.

(First Interpolation Unit (Directional Interpolation))

Next, an operation of the first, interpolation unit 202 will be described in detail.

In the first interpolation unit 202, first, a rectangular region of a predetermined size centering on the subject pixel, for example an encompassed 5×5 pixel block in this embodiment, is extracted from the first component U.

FIG. 9 is a view showing a 7×7 pixel block extracted from the first component U. Ruij, Guij, Buij respectively denote pixels of the first component U in red (R), green (G), and blue (B).

First, an edge direction corresponding to the color signal of the subject pixel is obtained by the edge direction determination unit 109. In accordance with the obtained edge direction, G signal interpolation, or in other words generation of a G signal in the position of R or B, is performed.

An example of a process for generating a missing G signal Gu33 in the position 33 of FIG. 9 will be described below.

When the obtained edge direction is E1, it is determined that an edge is formed in a horizontal direction, and therefore Gu33 is generated using horizontal direction interpolation processing shown in Equation (26).

$$Gu33=(Gu32+Gu34)/2+ah\times(Bu33-Bu31)+bh\times(Bu33-Bu35) \quad (26)$$

Here, a first order derivative value of the B pixel value is weighted and added in the second and third items such that interpolation processing is performed in accordance with the edge structure of the B signal. Interpolation weighting factors ah, bh are determined by Equation (27).

$$ah=f(\Delta Ca), bh=f(\Delta Cb) \quad (27)$$

Here, f(x) is a function shown in Equation (28), while $\Delta Ca$ and $\Delta Cb$ are shown in Equation (29).

$$f(x) = \begin{cases} -x/4T+1/4 & \text{if } 0<x<t \\ 0 & \text{if else} \end{cases} \quad (28)$$

Here, T is a predetermined threshold.

$$\Delta Ca=|Cr31-Cr32|+|Cr32-Cr33|+|Cr33-Cr31|,$$
$$\Delta Cb=|Cr35-Cr34|+|Cr34-Cr33|+|Cr33-Cr35|,$$
$$Cr31=Bu31-Gu31, Cr32=Bu32-Gu32,$$
$$Cr33=Bu33-Gu33, Cr34=Bu34-Gu34,$$
$$Cr35=Bu35-Gu35, Gu31=(Gu30+Gu32)/2,$$
$$Bu32=(Bu31+Bu33)/2, Gu33=(Gu32+Gu34)/2,$$
$$Bu34=(Bu33+Bu35)/2, Gu35=(Gu34+Gv36)/2 \quad (29)$$

When the obtained edge direction is E2, it is determined that an edge is formed in a vertical direction, and therefore similar processing to the horizontal direction interpolation processing is performed. More specifically, to generate the missing G signal Gv33 in position 33, Gu30, Bu31, Gu32, Bu33, Gu34, Bu35, Gu36 used in Equations (26) to (29) are replaced by Gu03, Bu13, Gu23, Bu33, Gu43, Bu53, Gu63, respectively.

When the obtained edge direction is E2 or E4, it is determined that an edge is formed in a 45° or a −45° diagonal direction, and therefore Gu33 is generated using isotropic interpolation processing shown in Equation (30).

$$Gu33=(Gu23+Gu32+Gu34+Gu43)/4 \quad (30)$$

The processing described above is performed in relation to all missing Gu pixels.

When a G signal having a pixel value has been generated in relation to all pixels using the processing described above, missing pixels in the R and B signals are generated using the generated G signals through interpolation processing. R, B interpolation is performed through linear interpolation of color difference.

An example of a process for generating missing B signals Bu23, Bu34, Bu24 in positions 23, 34, 24 of FIG. 9 will be described below.

Bu23 is generated by vertical direction interpolation processing shown in Equation (31).

$$Bu23=\{((Bu13-Gu13)+(Bu33-Gu33))/2\}+Gu23 \quad (31)$$

Bu34 is generated by horizontal direction interpolation processing shown in Equation (32).

$$Bu34=\{((Bu33-Gu33)+(Bu35-Gu35))/2\}+Gu34 \quad (32)$$

Bu24 is generated by isotropic interpolation processing shown in Equation (33).

$$Bu24=\{((Bu13-Gu13)+(Bu15-Gu15)+(Bu33-Gu33)+(Bu35-Gu35))/4\}+Gu24 \quad (33)$$

By subjecting a color difference signal (Buij−Guij) to linear interpolation in this manner, all missing Bu pixels are generated.

A method of interpolating a B signal was described above, but a missing R signal may be calculated using similar processing by replacing B with R. The interpolated second component V is transferred to the signal processing unit 111.

Next, actions and effects of the above image processing will be described.

According to the image processing described above, the first component U and second component V are separated, whereupon optimum interpolation processing taking into account the characteristics of each component is applied to each component. As a result, high quality interpolation processing can be performed.

Further, interpolation processing corresponding to the features of the interpolated second component V (in the second embodiment, an edge direction determined from the previously interpolated second component V) is performed on the first component U, and therefore interpolation processing can be performed while taking into consideration the features of the previously interpolated second component V. As a result, high quality interpolation processing can be performed.

Moreover, the interpolated first component U and second component V are synthesized, whereby an image signal I' subjected to optimum interpolation processing corresponding to the features of each component is obtained in relation to the original image signal I.

Further, noise reduction is performed on the separated second component V, and therefore highly precise noise reduction processing that does not affect the global edge structure included in the first component U can be performed. At this time, a noise amount in each local region of the second component V is estimated in advance, whereupon noise reduction processing is performed on the basis of the noise amount. As a result, highly precise noise reduction processing corresponding to the degree of noise attached to a local region of the second component V can be performed.

It should be noted that in the second embodiment, the processing performed from the component separation unit 104 to the component synthesis unit 112 is realized as hardware processing as a prerequisite, but this processing may be realized as software processing.

Figure 10:
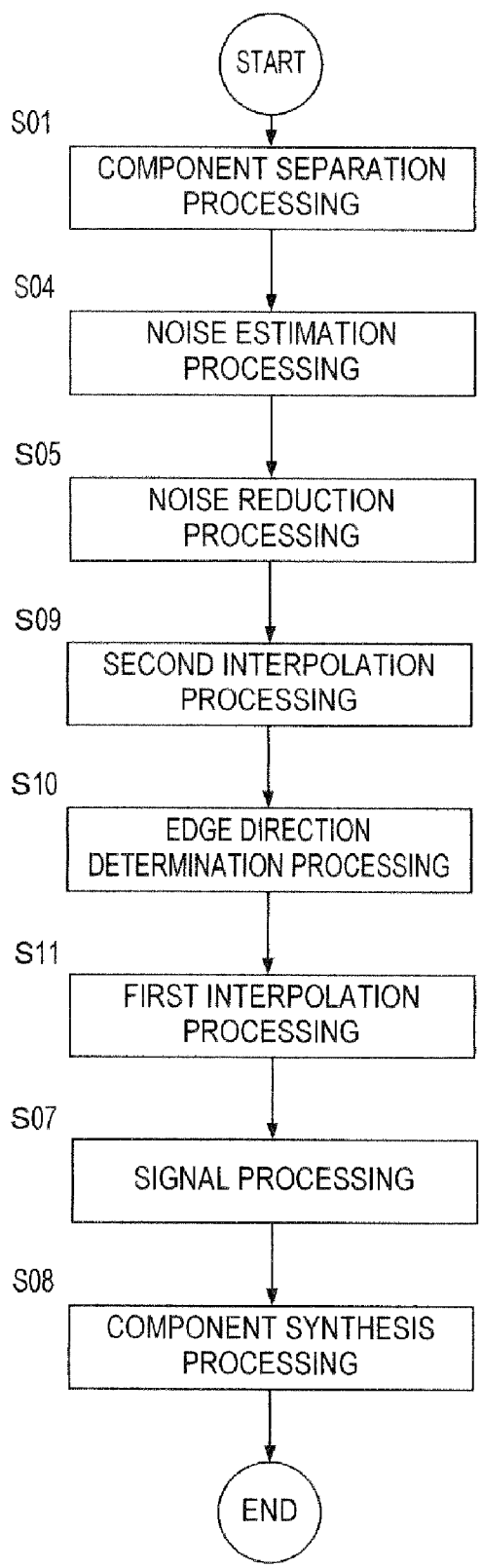
FIG. 10 is a flowchart corresponding to processing from the component separation unit 104 to the image synthesis unit 112, according to the second embodiment.

FIG. 10 is a flowchart showing a case in which the processing performed from the component separation unit 104 to the component synthesis unit 112 is realized as software processing. The software is stored on a computer-readable storage medium such as a magnetic disk, a magneto-optical disk, a CD-ROM, a DVD-ROM, or a semiconductor memory, or distributed via a communication line. The software is read to a RAM of a computer and executed by a CPU of the computer, whereby the processing described above is executed.

In a step S01, the original image signal I is separated into the first component U and the second component V.

In a step S04, the noise amount σ is estimated in relation to the second component V on the basis of the signal level of the first component U.

In a step S05, noise reduction processing is performed on the second component V through coring processing based on the noise amount σ estimated in S04.

In a step S09, interpolation processing is performed on the noise-reduced second component V.

In a step S10, the evaluation values indicating the edge directions are calculated on the basis of the second component V, whereupon the edge direction is determined on the basis of the evaluation values.

In a step S11, interpolation processing is performed on the first component U on the basis of the edge direction determined in S10.

In a step S07, predetermined signal processing, such as WB adjustment, γ correction and color emphasis processing, is implemented on the interpolated first component U.

In a step S08, the interpolated first, component U and the interpolated second component V are synthesized, whereby the synthesized image I' is obtained.

As has been described, the processing performed, from the component separation unit 104 to the component synthesis unit 112 maybe realized as software processing, and the same actions and effects can be achieved as in the case where the processing is realized as hardware processing.

Embodiments of this invention were described above. However, the embodiments described above are merely examples of applications of this invention, and are not intended to limit the technical scope of the invention to the specific constitutions of the embodiments described above.

This application claims priority based on Japanese Patent Application No. 2007-303551, filed with the Japan Patent Office on Nov. 22, 2007, the entire content of which is incorporated into this specification by reference.

What is claimed is:

1. An image processing device comprising:
a component separation unit that separates at least one of a plurality of color signals corresponding respectively to a plurality of color components constituting an image having the plurality of color components into a plurality of components including a first component, which is a skeleton component, and a second component obtained on the basis of the at least one color signal and the first component;
a first interpolation unit that interpolates the first component of the at least one color signal in a pixel position in which the color signal is missing; and
a second interpolation unit that interpolates the second component of the at least one color signal in the pixel position in which the color signal is missing.

2. An image processing device comprising:
a component separation unit that separates at least one of a plurality of color signals corresponding respectively to a plurality of color components constituting an image having the plurality of color components into a plurality of components including a first component constituted by a plurality of edges and a flat component located in a region between the plurality of edges, and a second component obtained on the basis of the at least one color signal and the first component;
a first interpolation unit that interpolates the first component of the at least one color signal in a pixel position in which the color signal is missing; and
a second interpolation unit that interpolates the second component of the at least one color signal in the pixel position in which the color signal is missing.

3. The image processing device as defined in claim 1, wherein the second interpolation unit performs interpolation processing on the second component in accordance with a feature of the first component interpolated by the first interpolation unit.

4. The image processing device as defined in claim 3, further comprising a direction determination unit, that determines a direction of an edge component from the interpolated first component.

5. The image processing device as defined in claim 1, wherein the first interpolation unit performs interpolation processing on the first component in accordance with a feature of the second component interpolated by the second interpolation unit.

6. The image processing device as defined in claim 5, further comprising a direction determination unit that determines a direction of an edge component from the interpolated second component.

7. The image processing device as defined in claim 1, wherein the first interpolation unit comprises an energy calculation unit for calculating a total variation energy (Total-Variation norm) in relation to the first component and performs interpolation processing on the first component by minimizing the total variation energy.

8. The image processing device as defined in claim 1, further comprising a synthesis unit that synthesizes the first component prior to interpolation in the pixel position in which the color signal is missing and the second component following interpolation in the pixel position in which the color signal is missing.

9. The image processing device as defined in claim 1, further comprising a noise reduction unit that performs noise reduction processing on the second component.

10. The image processing device as defined in claim 9, wherein the noise reduction unit comprises a noise estimation unit for estimating a noise amount in each subject pixel and each local region including the subject pixel in relation to the second component, and performs noise reduction processing on the basis of the estimated noise amount.

11. The image processing device as defined in claim 1, wherein the second component is obtained by subtracting a signal value of the first component from a signal value of the at least one color signal.

12. The image processing device as defined in claim 1, wherein the second component is obtained by dividing a signal value of the at least one color signal by a signal value of the first component.

13. A computer-readable storage device storing a program that is executable by a computer to perform a process comprising:
separating at least one of a plurality of color signals corresponding respectively to a plurality of color components constituting an image having the plurality of color components into a plurality of components including a first component, which is a skeleton component, and a second component obtained on the basis of the at least one color signal and the first component;
interpolating the first component of the at least one color signal in a pixel position in which the color signal is missing; and
interpolating the second component of the at least one color signal in the pixel position in which the color signal is missing.

14. A computer-readable storage device storing a program that is executable by a computer to perform a process comprising:
separating at least one of a plurality of color signals corresponding respectively to a plurality of color components constituting an image having the plurality of color components into a plurality of components including a first component constituted by a plurality of edges and a flat component located in a region between the plurality of edges, and a second component obtained on the basis of the at least one color signal and the first component;
interpolating the first component of the at least one color signal in a pixel position in which the color signal is missing; and
interpolating the second component of the at least one color signal in the pixel position in which the color signal is missing.

15. The computer-readable storage device as defined in claim 13, wherein, in the step of interpolating the second component, interpolation processing is performed on the second component in accordance with a feature of the first component interpolated in the step of interpolating the first component.

16. The computer-readable storage device as defined in claim 13, wherein, in the step of interpolating the first component, interpolation processing is performed on the first component in accordance with a feature of the second component interpolated in the step of interpolating the second component.

17. The computer-readable storage device as defined in claim 13, wherein the second component is obtained by subtracting a signal value of the first component from a signal value of the at least one color signal.

18. The computer-readable storage device as defined in claim 13, wherein the second component is obtained by dividing a signal value of the at least one color signal by a signal value of the first component.

* * * * *